（12） United States Patent
Welter, Jr.

(10) Patent No.: US 6,453,037 B1
(45) Date of Patent: *Sep. 17, 2002

(54) REMOTE TELECOMMUNICATIONS SYSTEM FOR AUTOMATIC NUMBER IDENTIFICATION SCREENING

(75) Inventor: William G. Welter, Jr., Colorado Springs, CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 13 days.

(21) Appl. No.: 08/706,989

(22) Filed: Aug. 15, 1996

Related U.S. Application Data

(63) Continuation of application No. 08/424,969, filed on Apr. 19, 1995.

(51) Int. Cl.[7] .......................... H04M 1/64; H04M 3/42; H04M 7/42
(52) U.S. Cl. .............. 379/243; 379/88.19; 379/201.01; 379/201.07; 379/207.13; 379/219; 379/220.01; 379/245
(58) Field of Search .............................. 379/67, 88, 89, 379/242–245, 268, 269, 67.1, 88.1, 201, 88.19, 88.2, 88.21, 114.01, 114.28, 114.29, 115.01, 121.01, 142.01, 142.07, 201.01, 201.02, 201.07, 201.12, 207.13, 207.15, 219, 220.01, 221.02, 221.08, 221.09, 221.14

(56) References Cited

U.S. PATENT DOCUMENTS

| | | | |
|---|---|---|---|
| 4,162,377 A | 7/1979 | Mearns | 179/18 |
| 4,756,020 A | 7/1988 | Fodale | 379/112 |
| 4,763,191 A | 8/1988 | Gordon et al. | 358/86 |
| 4,776,003 A | 10/1988 | Harris | 379/91 |
| 4,799,255 A * | 1/1989 | Billenger et al. | 379/189 |
| 4,899,373 A | 2/1990 | Lee et al. | 379/207 |
| 5,003,584 A * | 3/1991 | Benyacar et al. | 379/127 |
| 5,040,177 A | 8/1991 | Martin et al. | 370/110.1 |
| 5,136,636 A * | 8/1992 | Wegrznowicz | 379/201 |
| 5,163,086 A * | 11/1992 | Ahearn et al. | 379/144 |
| 5,251,255 A * | 10/1993 | Epley | 379/242 |
| 5,259,026 A * | 11/1993 | Johnson | 379/207 |
| 5,303,285 A | 4/1994 | Kerihuel et al. | 379/58 |
| 5,325,421 A * | 6/1994 | Hou et al. | 379/67 |
| 5,335,278 A * | 8/1994 | Matchett et al. | 379/59 |
| 5,353,331 A | 10/1994 | Emery et al. | 379/58 |
| 5,392,343 A * | 2/1995 | Davitt et al. | 379/201 |
| 5,406,616 A * | 4/1995 | Bjorndahl | 379/59 |
| 5,430,782 A * | 7/1995 | Brady et al. | 379/207 |
| 5,440,614 A * | 8/1995 | Sonberg et al. | 379/59 |
| 5,454,027 A * | 9/1995 | Kennedy et al. | 379/60 |
| 5,467,388 A * | 11/1995 | Redd, Jr. et al. | 379/201 |
| 5,469,496 A * | 11/1995 | Emery et al. | 379/58 |
| 5,473,671 A * | 12/1995 | Partridge, III | 379/142 |
| 5,490,203 A * | 2/1996 | Jain et al. | 379/59 |
| 5,574,780 A * | 11/1996 | Andruska et al. | 379/207 |
| 5,579,379 A * | 11/1996 | D'Amico et al. | 379/112 |
| 5,583,920 A * | 12/1996 | Wheeler, Jr. | 379/88 |
| 5,610,969 A * | 3/1997 | McHenry et al. | 379/56 |
| 5,673,308 A * | 9/1997 | Akhavan | 379/61 |
| 5,703,935 A * | 12/1997 | Raissyan et al. | 379/88 |
| 5,706,339 A * | 1/1998 | Eisdorfer et al. | 379/211 |

* cited by examiner

*Primary Examiner*—Allan Hoosain

(57) ABSTRACT

The network control system, servicing a long distance carrier switching office, is provided with a caller's automatic number identification (ANI) when a calling party calls a called party. Using a database, a processor of the network control system determines call type characteristics of the telephone call based on the received ANI for wireless and land-line telephone calls. The network control system then returns either an index or routing information to the long distance carrier switching office. After the ANI is screened by the network control system, subsequent call processing takes place in the long distance carrier switching office.

8 Claims, 4 Drawing Sheets

REMOTE TELECOMMUNICATIONS SYSTEM FOR AUTOMATIC NUMBER IDENTIFICATION SCREENING

This application is a continuation of U.S. patent application Ser. No. 08/424,969, filed Apr. 19, 1995.

FIELD OF THE INVENTION

This invention relates to telecommunications systems and in particular to a telecommunications system for controlling the routing of telephone traffic based on the telephone number of the calling station.

BACKGROUND OF THE INVENTION

Most telephone calls typically access the long distance network from shared facilities, such as a public switched network. As shown in FIG. 1, a long distance call is originated from either a land-line calling station 100 or a wireless calling station 102. The call is sent to the local exchange carrier (LEC) switching office 104 via trunks 101 or 103. From the LEC switching office 104, the long distance call is routed, via a trunk 105, to a long distance carrier switching office 106, hereinafter referred to as a switch. The call may then be routed to another switch 108 if needed to complete the communication. The LEC switching office 104 sends the caller's automatic number identification (ANI), i.e., the origination phone number, and the destination address to the switch 106. If the destination address is an 800 number, the call progresses through the normal routing to its destination. However, if the destination address is private, direct distance dialing (DDD), or international direct distance dialing (IDDD), the caller's ANI is checked in the switch 106 for any restrictions or processing enhancements that are required for this particular caller. Based on applicable restrictions, the caller may be blocked from making this call, sent to an operator, prompted for account codes, routed to the desired destination, etc.

Currently, the ANI screening is performed in the switch 106. The ANI screening table, located in the switch 106, typically contains only the ANIs active in that local area, i.e., the ANIs for only three or four area codes, known as numbering plan areas (NPA). If a particular ANI has no restrictions, it is not contained in the ANI screening table of the switch 106.

When a cellular phone accesses the long distance carrier network, its ANI is processed the same way as the land-line ANI. The problem arises, however, when the cellular roamer is originating a call outside its serving area. Due to prohibitive memory requirements, all cellular ANIs cannot be loaded in each long distance carrier switch. The switch 106, therefore, cannot provide adequate screening for every caller. If the roamer's ANI is received, the call must be processed with no restrictions. This situation causes problems in the long distance carrier network. Virtual private network (Vnet®) cellular customers can not be identified when they are roaming outside their serving area, and can not use their Vnet® dialing plans. In addition, identification of calls from fraudulent users is virtually impossible.

To summarize, the current ANI screening cannot process ANIs for calls which originate from outside the local serving area (LSA), such as cellular and personal communications service (PCS) traffic. The amount of memory in the switch required to include all non-local ANIs would be extremely large and cost prohibitive. A need therefore exists for a telecommunications system which provides ANI screening for land-line and wireless telephone calls which originate in, as well as outside, the local serving area.

OBJECTS OF THE INVENTION

It is therefore an object of the invention to provide a telecommunications system for screening and processing ANIs from local and non-local areas.

It is another object of the invention to provide a telecommunications system for screening ANIs for cellular and PCS customers.

It is yet another object of the invention to provide a telecommunications system for screening and processing ANIs from a single common location.

SUMMARY OF THE INVENTION

These and other objects, features, and advantages are accomplished by a remote telecommunications system for automatic number identification screening.

When a calling station originates a telephone call to a called station, the call is routed via a shared facility to a long distance carrier switch. The switch is served by a network control system (NCS) which serves a plurality of long distance switches. The network control system includes a database and a control manager for screening an automatic number identification of the calling station. Responding to the request from the switch, the network control system provides an identifying information to the switch for ascertaining call type characteristics of the telephone call based on its automatic number identification.

DESCRIPTION OF THE PREFERRED EMBODIMENTS

Figure 1:
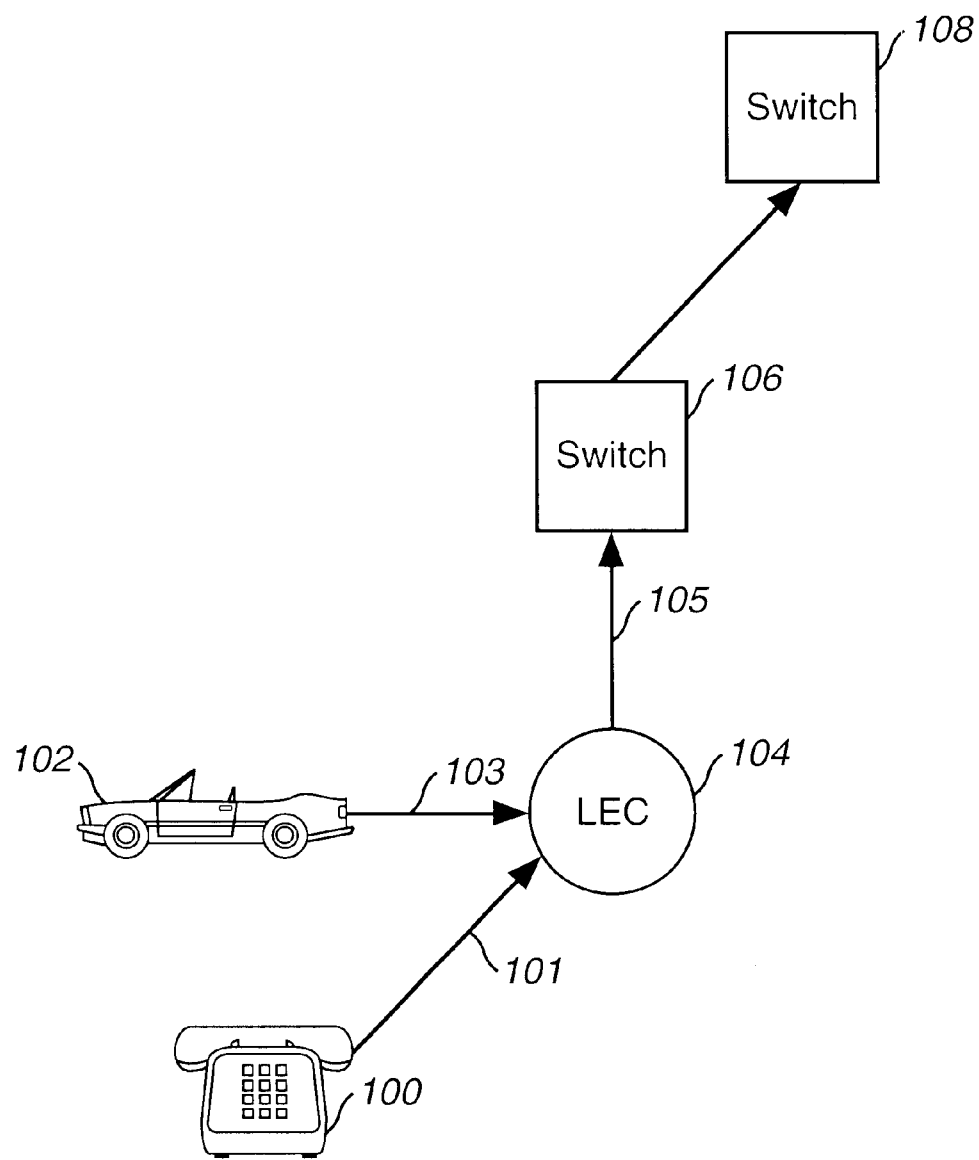
FIG. 1 is a prior art processing of the caller's ANI in the switch.
Figure 2:
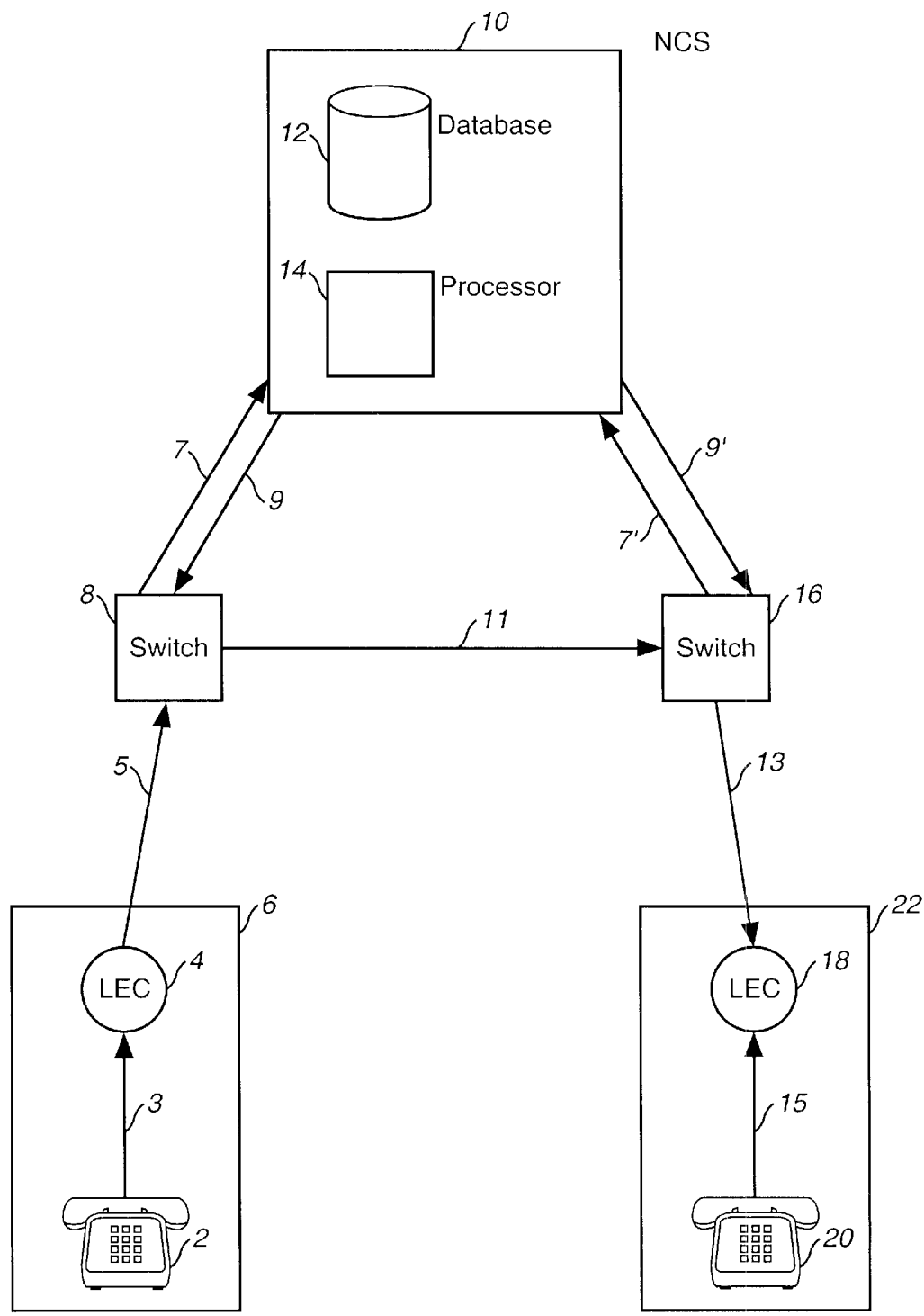
FIG. 2 is a telecommunications systems for the remote ANI screening of a land-line telephone call.

A high level overview of one embodiment of the invention is shown in FIG. 2, while a detailed description is provided later in the application. FIG. 2 illustrates a telecommunications systems for the remote ANI screening of a land-line telephone call. A calling station 2 originates a telephone call by dialing a telephone number of the called station 20. As soon as the last digit of the telephone number of the called station 20 is entered by the calling station 2 and prior to the ringing at the called station 20, the signaling information, containing the ANI, is passed through a line 3, connecting the calling station 2 to LEC switching office 4 within LEC network 6. The signaling information further proceeds through a trunk 5 to a switch 8 of the long distance carrier. Next, the switch 8 sends a request message 7 to an NCS 10 for call type processing via X.25 protocol used for communication between the switch 8 and the NCS 10. The request message 7 contains the ANI of the calling station 2 for determining the restrictions or characteristics of the call made by the calling station 2. The NCS 10 includes a database 12 and a processor 14 which controls the servicing of the database 12.

After determining—via the database 12 and the processor 14—the requested call type characteristic, the NCS 10 returns a response message 9 to the switch 8 via X.25 protocol used for communication between the switch 8 and the NCS 10. The response message 9 contains the requested information on the call type, and/or routing address, based on the call type, as explained later in the application. The response message 9 may provide an index to the internal tables of the LEC switching office 4 or actual routing information for terminating the call to its destination. The call is forwarded to a switch 16 via a trunk 11. Subsequently, the call is routed to the called station 20 via a trunk 13 and a line 15 connecting the LEC switching office 18 and the called station 20. In some cases, an automated message may be sent to the calling station 2 for treating the call. If the response message 9 indicates that the call requires an operator assistance, the call will be routed accordingly. Although not explicitly described here, other call processing may be performed by the switch 8, as known in the art.

It is, of course, understood that the switch 16 may request the call type processing via messages 7' and 9' if the call is originated by the calling station 20.

Figure 3:
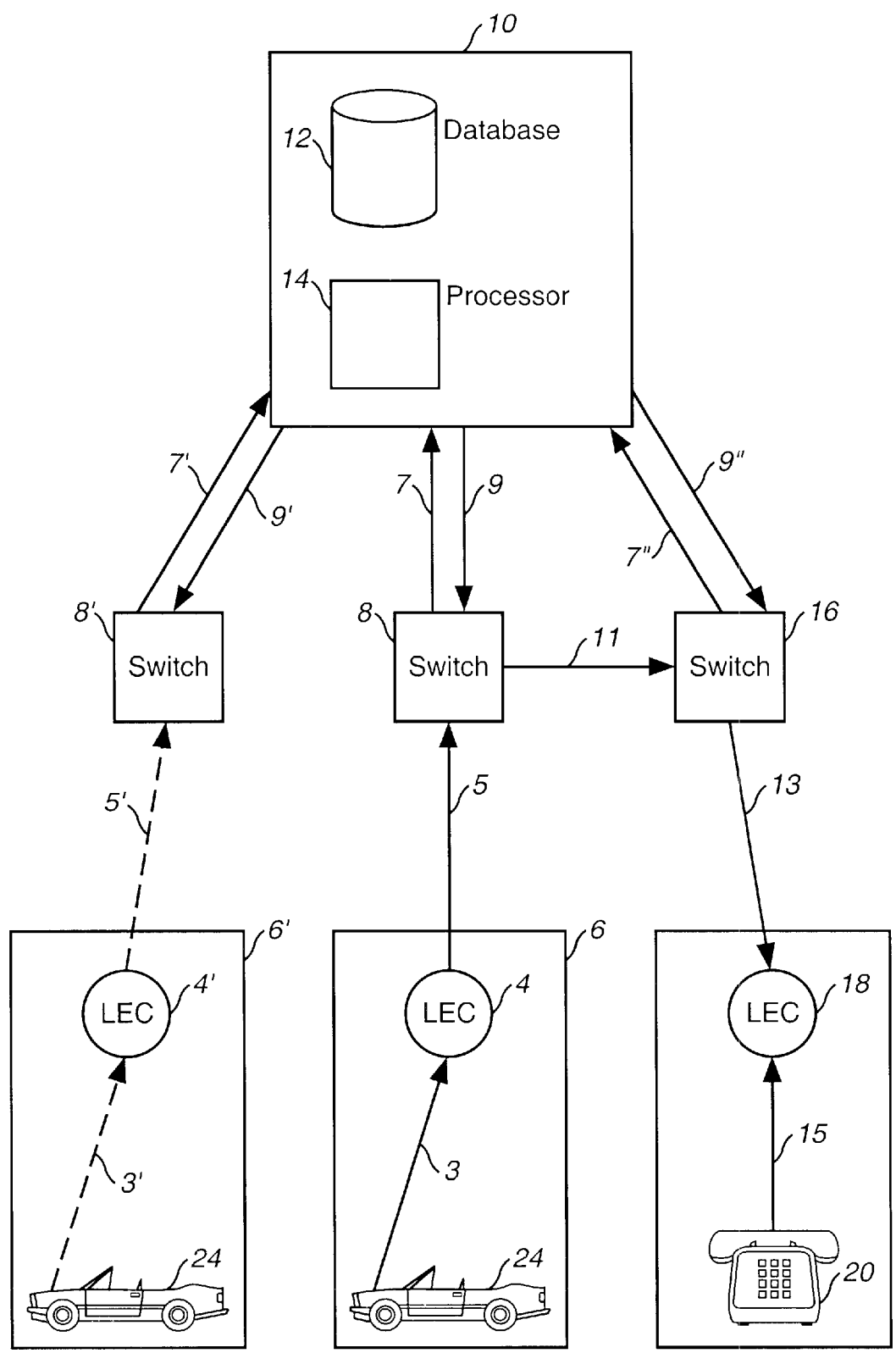
FIG. 3 is a telecommunications systems for the remote ANI screening of a wireless telephone call.

FIG. 3 shows a telecommunications systems for the remote ANI screening of a wireless telephone call. In FIGS. 2 and 3, like reference numerals designate identical components of the disclosed invention. In FIG. 3, the ANI of a cellular roamer 24 is located in the local serving area of a local switch 8'. The cellular roamer 24 then enters the area which is outside the service of the local switch 8'. The new area is served by the non-local switch 8.

Continuing with FIG. 3, ANIs which are not contained in the local serving area of the switch, such as cellular roamer or PCS, are screened by the NCS 10 the same way as the land-line telephone call described above. The cellular roamer 24 originates the call in non-local area. The call then proceeds to the calling station 20 and is processed in identical manner as described above in the land-line example.

Generally, the ANI screening can be performed in several ways. One method of screening is for the switch 8 to access the NCS 10, even though the ANI is local. The NCS 10 then determines the call type characteristics and returns, via the response message 9, the routing information to the switch 8.

Another method of screening includes accessing the NCS 10 only if the call is non-local. The switch 8 accesses the NCS 10 to provide ANI screening only if that ANI is not from an area that is served by the switch 8. Each switch has a small table which indicates which NPAs (area codes) define the local serving area of the switch 8, and an ANI index. Thus, prior to performing the existing ANI screening, a processor in the switch 8 compares the NPA (area code) of the caller's ANI with entries in the local serving area table. If the NPA of the ANI does not match an entry in the local serving area table, the switch 8 assigns a default ANI index, defined by a global switch parameter. The switch 8 uses this default ANI index to access its own table of restrictions. If the ANI index restrictions table indicates that the processing by NCS 10 must be invoked, the switch 8 will launch the appropriate query to the NCS 10. The ANI index restrictions table may also provide for processing of the call by the switch 8 instead of the NCS 10.

If, however, the NPA of the ANI matches an entry in the local serving area table, the processor in the switch 8 checks its own existing ANI screening table and processes the call according to the restrictions.

Figure 4:
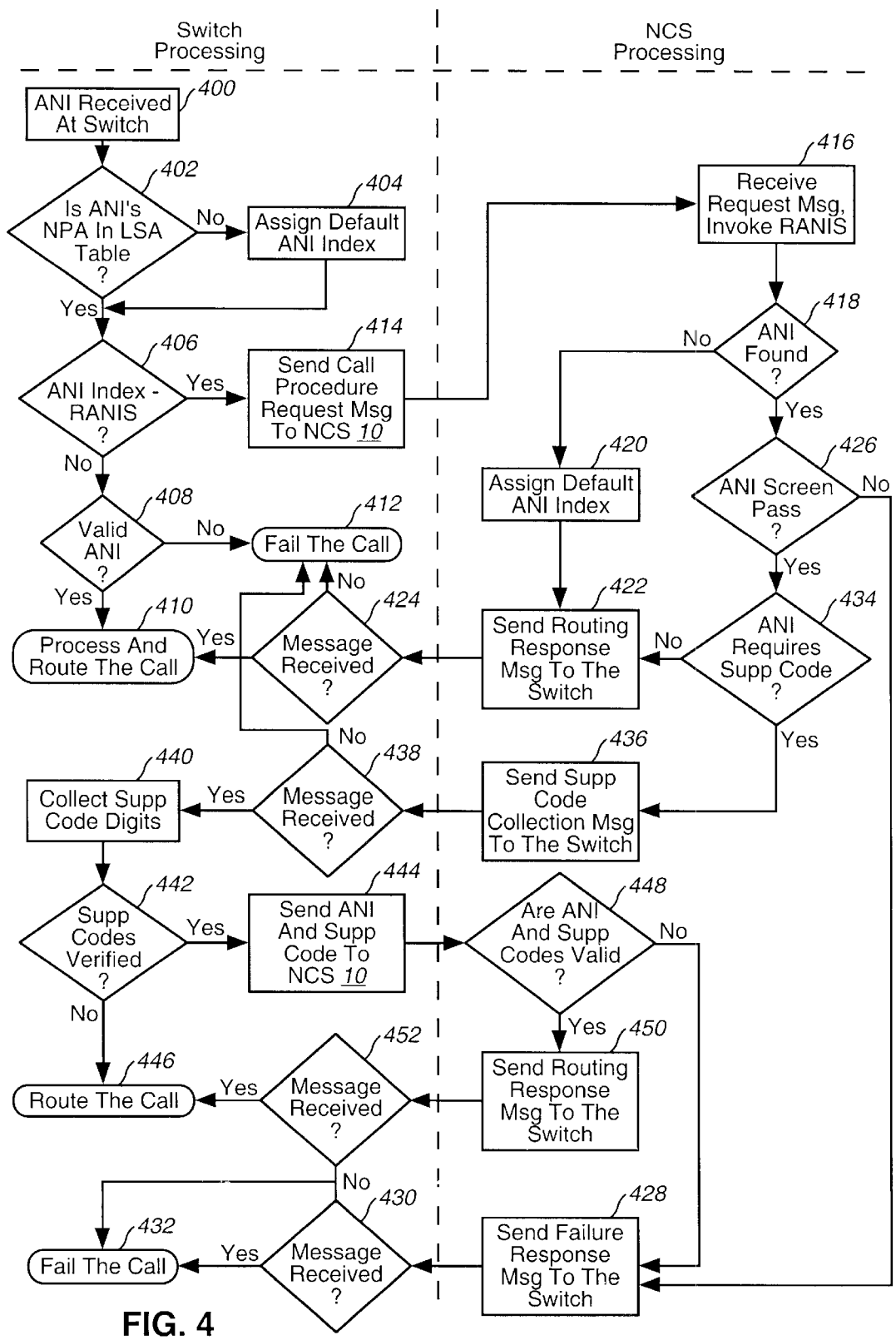
FIG. 4 is a flowchart for one embodiment of the remote ANI screening.

FIG. 4 is a flowchart of sequencing steps for remotely screening the caller's ANI using the latter method. In step 400, the switch 8 receives the caller's ANI from the LEC switching office 4. The decision is then made whether the area code (NPA) of the received ANI is contained in the local serving area (LSA) table of the switch 8, as shown in step 402. If NPA is found, the index is assigned to the call. If NPA is not found in the table, the switch 8 assigns a default index to the call in step 404. Based on the contents of either non-default or default index, in step 406 the switch 8 decides whether RANIS (Remote ANI Screening) must be invoked in the NCS 10. If the index indicates that no NCS 10 processing is needed, the verification is made that the ANI is valid in step 408, and the call is either routed or failed by the switch 8, as shown respectively in steps 410 and 412.

If the index points to the NCS-based processing, in step 414 the switch 8 launches the request message 7 to the NCS 10. After receiving the request in step 416, the NCS 10, via the processor 14 and the database 12, checks the appropriate table to find the call type characteristics for the received ANI for determining the index in step 418. If the ANI is not found, it is assigned a default index in step 420. The NCS 10 then sends the default index in the response message 9 back to switch 8 in step 422. The switch 8 receives the response message 9 in step 424, and based on the index either routes the call or fails it, as shown in steps 410 and 412 respectively.

If the caller's ANI is found by the NCS 10 in step 418, the index is assigned, and the call type characteristics are determined in step 426, provided no supplementary codes are needed. If the call type characteristics point to an impermissible telephone call, the NCS 10 returns the response message 9 to the switch 8 (step 428) which after receiving this message 9 in step 430 fails the call, as shown in step 432.

If the call type characteristics point to a permissible call, the NCS 10 checks whether supplementary codes are required to complete the call, as shown in step 434. If the supplementary codes are not required, either the addressing information based on the assigned index or the assigned index itself is sent to the switch 8 in step 422. The switch 8 processes the response message 9 as previously described in steps 424, 410, and 412.

When the supplementary codes must be collected for completing the call, in step 436 the NCS 10 transmits the request for supplementary codes to the switch 8 via the response message 9. After checking for receipt of the response message 9 in step 438, the switch 8 collects the supplementary codes from the calling station 2 in step 440, and determines whether verification for the codes is required in step 442. If codes must be verified, the codes and the ANI are again sent to the NCS 10 for appropriate processing in step 444. The call is routed in step 446 provided no NCS-based verification is required.

In step 448, the NCS 10 determines the validity of the supplementary codes, as well as the ANI. If the codes or the ANI are invalid, the failure in the response message 9 is returned to the switch 8 in step 428, and the switch 8 consequently fails the call in step 432 after receiving the response message 9 in step 430. If the codes and the ANI are valid, the NCS 10 returns either the addressing information or the index to the switch 8, as shown in step 450. The switch 8 then completes the call in step 446, if the response message 9 is received in step 452 or fails the call in step 432 if the response message 9 is not received in step 452.

When the switch 8 invokes ANI screening via NCS 10 using any of the previously defined methods, the switch 8 formulates the request message 7 to send to the NCS 10. The request message 7 includes the ANI and an indicator that shows that ANI screening is required.

After the NCS 10 receives the request message 7 from the switch 8, the NCS 10 checks the bit in the ANI parameter of the request message 7. If the bit is set to one, the NCS 10 performs ANI screening. Otherwise, the NCS 10 assumes that this ANI has been previously screened by the switch 8.

The NCS 10 has a table which contains the ANIs and their respective ANI indexes. The NCS ANI index points to a list of indicators which identify the subset of ANI screening restrictions. These restrictions are similar to the switch-based ANI screening parameters but allow processing an optional subsequent routing in some cases.

validated supplementary code that is requited by the 8. This information is returned in the response message 9, so that the switch 8 can collect the required number of supplementary code digits. The NCS 10 uses length of two, three or four digits for the customers that require validation.

The NCS ANI Index points to an entry in the NCS ANI Index Table, which contains applicable restrictions. A representative NCS ANI Index Table is as follows:

NCS ANI Index Table

| NCS ANI Index # | PRS | DR | SOS | 900 | OSD | PAC | TOD | IR | BC | PN | BOC |
|---|---|---|---|---|---|---|---|---|---|---|---|
| 0 | 0 | 0 | 0 | 0 | 0 | 0 | 0 | 0 | 0 | 0 | 1 |
| 7 | 0 | 1 | 0 | 1 | 1 | 1 | 0 | 1 | 0 | 021 | 1 |
| 13 | 0 | 0 | 0 | 0 | 0 | 0 | 0 | 0 | 0 | 007 | 1 |

PRS = Prison (0/1) - If this bit is set to 1, the NCS 10 provides subsequent routing to a manual operator platform, and sends back default routing which will be used in the outgoing response message 9.
DR = Digital Routing required (0/1) - If this bit is set to 1, the NCS 10 provides applicable routing for this call if required.
SOS = Special Operator Service required (0/1) - If this bit is set to 1, the NCS 10 provides subsequent routing to an automated or manual operator, and sends back default routing which will be used in the outgoing response message 9.
900 - 900 Service denied (0/1) - If this bit is set to 1, and the customer has dialed a 900 number, the NCS 10 provides subsequent routing to an announcement or tone, or provides a failure Action Code.
OSD = Operator Service Denied (0/1) - If this bit is set to 1, and the Address Digits and Nature Of Call indicate that this call is an Operator Assisted call, the NCS 10 provides subsequent routing to an announcement or tone, or provides a failure Action Code.
PAC = Public Access (0/1) - If the Information Digits value received is 06, 07, or 27, and this bit is set to a 0, Toll calls will be blocked. If this bit is set to 1, toll calls will be allowed. Cellular calls should have Information Digits values of 61, 62, or 63, and this bit should not impact Cellular calls.
TOD = Time of Day restriction (0/1) - If this bit is set to 1, the NCS 10 provides applicable Time of Day restrictions for this call.
IR = International Restriction (0/ 1). If this bit is set to 1, and the Address is an International Destination, the NCS 10 provides subsequent routing to an announcement, tone, automated or manual operator, or provides a failure Action Code.
BC = Block Call (0/1) - If this bit is set to 1, NCS 10 provides subsequent routing to an announcement, tone, or automated or manual operator, or provides a failure Action Code.
PN = Partition Number (000–999) - The 3-Digit Partition Number is used for routing, and is returned to the switch 8 in the response message 9.
BOC = BOC Card allowed (0/1) - If this bit is set to 0, and the Address and Nature Of Call indicate that this is an LEC Card Call, the NCS 10 provides subsequent routing to an announcement, tone, automated or manual operator, or provides a failure Action Code.

As an example, the NCS ANI screening table comprises the following fields.

NCS ANI SCREENING TABLE

| ANI | Vnet ® | NCS ANI Index | Account Code Index | Account Code Length |
|---|---|---|---|---|
| 214-555-1212 | Y | 0 | 0 | 0 |
| 214-918-3000 | N | 7 | 517 | 3 |
| 817-999-7171 | N | 13 | 12 | 2 |

If Vnet® field is set to one, the NCS performs further address checking and translations. The next field is NCS ANI index. This field is used to reference the NCS ANI index table and may be returned to the switch 8 in the response message 9. Next field is account code index which is used in conjunction with the account code length field. This information is used by the NCS 10 to access the correct account code index used for the NCS-based supplementary code validation. Yet another field is ACL which is an account code length. This field identifies the length of the NCS During screening of the ANI, the NCS 10 determines whether supplementary codes need to be collected for this particular ANI/Destination. The NCS 10 sends the response message 9, containing a request for collecting supplementary code digits, back to the switch 8. If the supplementary codes are to be collected by the switch 8 and then sent back to the NCS 10 for validation, the response message 9 with supplementary code digits does not contain a terminating address or action code. However, if the supplementary codes are to be collected and not sent back to the NCS 10 for validation, the response message 9 contains an action code and a destination address if the address has been translated.

After receiving the response message 9 requesting collection of supplementary code digits, the switch 8 prompts the caller of the calling station 2 for the supplementary code digits, and collects the appropriate number of digits. Once the required number of digits have been collected, the switch 8 formulates another request message 7 and sends it to the NCS 10. This request message 7 is the same as the initial request message 7, except that is contains supplementary code digits.

The NCS 10 responds to the request message 7 from the switch 8 by formulating the response message 9. If the NCS 10 is unable to provide ANI screening, the NCS 10 sends the response message 9 to the switch 8 with the appropriate action code which indicates the failure.

If the NCS 10 can screen the ANI and determine an NCS-based ANI index number, but is unable to provide further processing for this ANI index, the NCS 10 sends the response message 9 which contains the index without the destination address. Using its own internal tables, the switch 8 determines the call type restrictions based on the NCS-provided index to perform the call processing.

Once screening, translation and processing are complete, and if supplementary code digits are not to be collected, or if supplementary code digits have already been collected and validated, the NCS 10 sends the response message 9 back to the switch 8. Depending on the type of the call, the response message 9 may either contain the applicable routing information or the ANI-based index as described above. The switch 8 receives the response message 9, which controls the subsequent processing at the switch 8.

If the switch 8 is unable to send the request message 7, or if the response message 9 is not received for the query, the switch 8 does not process this call as a default. Instead, the call is treated by an attendant stating that the call cannot be completed. The switch 8 records the ANI index that was used to invoke the screening, the appropriate treatment number, and the action code to document the error.

If the switch 8 receives the routing response message from the NCS 10 and the message has a valid routing action code and a valid destination address, the switch 10 uses the existing call processing to route the call.

The database 12 of the NCS 10 contains ANI screening tables for a plurality of switches. The tables are filled with data containing similar screening information found in the switch-based ANI screening tables. The tables contain the ANI, its associated call restrictions, and an applicable account code length and index information, as indicated in the above example.

Since those skilled in the art can modify the disclosed specific embodiment without departing from the spirit of the invention, it is, therefore, intended that the claims be interpreted to cover such modifications and equivalents.

What is claimed is:

1. In a telephone network of a long distance carrier, a telecommunications system for screening a calling station telephone number using automatic number identification (ANI), comprising:
   a calling station assigned to a local serving area of a switching office for originating a telephone call to a called station;
   at least one other switching office having a different local serving area responsive to said telephone call made in said different local serving area from said calling station via a shared facility, said one other switching office providing communication between said calling station and said called station and responsive to a table of calling restrictions included in said assigned local serving area for a telephone call being placed through said one other switching office; and
   a network control system serving said at least one other switching office and said switching office and including at least one database having a table and processing means, said network control system:
   receiving an X.25 protocal request message and obtaining an index from its table based on said calling station telephone number and sending said index via an X.25 protocol response message to said at least one other switching office, said at least one other switching office using said index to obtain calling restrictions on said telephone call, said calling restrictions being in a table located in said switching office, whereby said telephone call is screened in accordance with said obtained calling restrictions,
   wherein routing information for terminating the call to the called station is selectively retrieved from either a LEC switching office or the network control system.

2. The telecommunications system according to claim 1, wherein said shared facility comprises a local exchange carrier within a public switched network.

3. The telecommunications system according to claim 1, wherein said database comprises a plurality of telephone numbers for comparing with said calling station telephone number received from said switching office.

4. The telecommunications system according to claim 1, wherein said processing means requests supplementary code digits corresponding to said calling station telephone number, which are collected by said switching office.

5. The telecommunications system according to claim 4, wherein said processing means validates said supplementary code digits.

6. The telecommunications system according to claim 1, wherein said index is obtained from a table in said database by said processing means.

7. In a telephone network of a long distance carrier, a telecommunications system for screening a calling station telephone number using automatic number identification (ANI), comprising:
   a calling station assigned to a local serving area associated with a first switching office for originating a telephone call from a location in a different local serving area associated with at least a second switching office;
   said second switching office responsive to said telephone call from said calling station location via a shared facility and providing communication between said calling station and said called location, wherein said second switching office determines whether said calling station telephone number is located within a local serving area for ascertaining calling stations stored in a table of said second switching office on said telephone call; and
   a network control system serving said second switching office in addition to said first switching office and including at least one database and a processing means, said network control system:
   receiving, via an X.25 protocol request message, said calling station telephone number located in said second switching office, said network control system obtaining an index from a table of said database based on said calling station telephone number and sending said index, via an X.25 protocol response message, to said second switching office, said second switching office using said index to obtain calling restrictions on said telephone call, from said table, whereby said telephone call is screened in accordance with said obtained calling restriction,
   wherein routing information for terminating the call to the called station is selectively retrieved from either a LEC switching office or the network control system.

8. The telecommunication system according to claim 7 wherein a processing system means of said first switching office accesses a table containing area codes which define said local serving area of said first switching office.

* * * * *